Aug. 16, 1927.
E. ALLEN
MILK CAN HOLDER AND CONTENTS DISPENSER
Filed Sept. 29, 1926
1,639,249
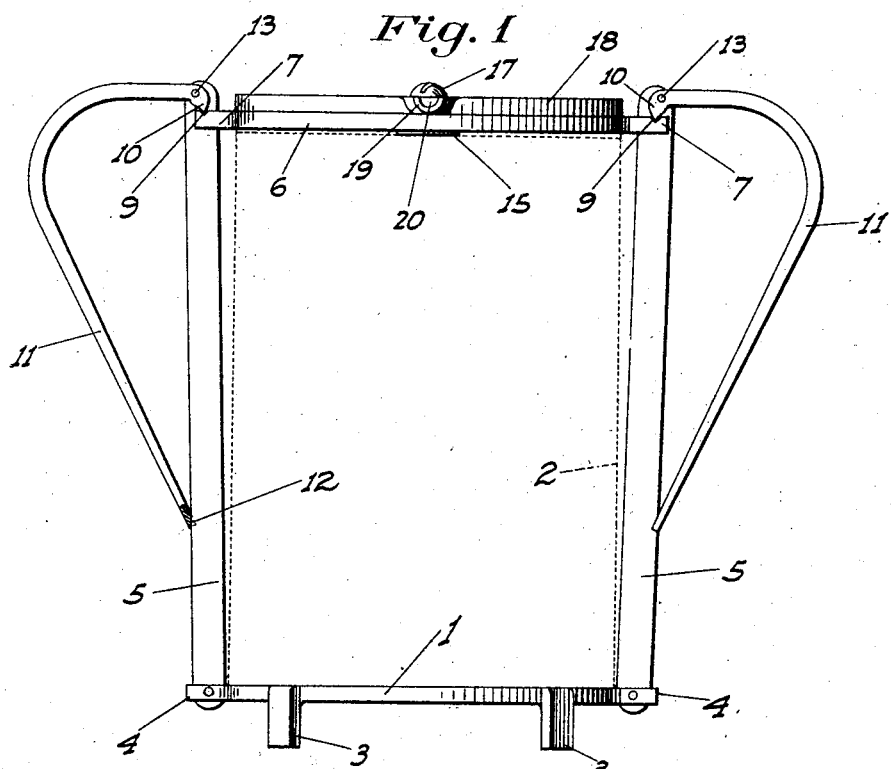
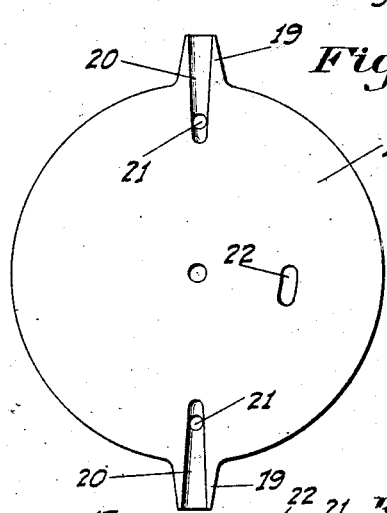
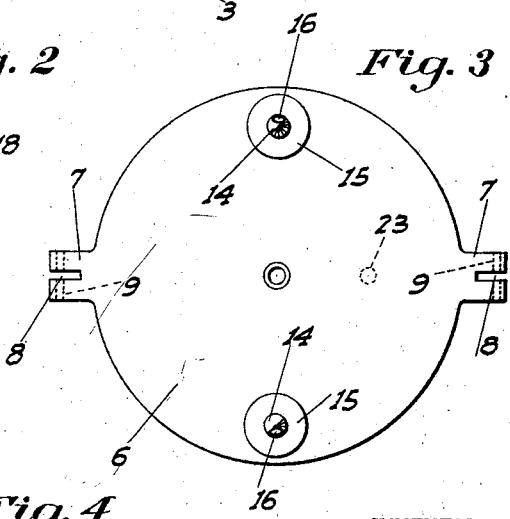
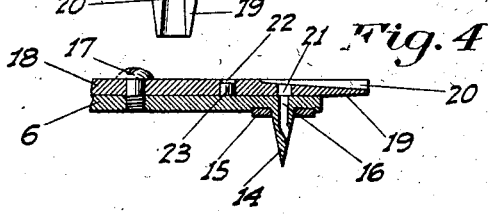
INVENTOR.
Ernest Allen
BY
ATTORNEY Patented Aug. 16, 1927.

1,639,249

UNITED STATES PATENT OFFICE.

ERNEST ALLEN, OF GROVELAND, CALIFORNIA.

MILK-CAN HOLDER AND CONTENTS DISPENSER.

Application filed September 29, 1926. Serial No. 138,390.

This invention relates to improvements in devices for puncturing condensed milk cans and for dispensing the contents of the can through the openings thus made.

My principal objects are to provide a device for the purpose which when applied to such a can will puncture the same at opposed points; will provide means for then rigidly holding the can and puncturing elements in engaging relation; and will enable the can to be then manipulated so that the contents may be then dispensed from the can without removing the puncturing elements from engagement with the can.

Means is also provided arranged in unitary relation with the device for enabling the dispensing openings to be easily closed when the pouring operations have been completed and without removing the device from the can, thus not only avoiding the admission of air to the contents of the can but preventing said contents from spilling out should the can be upset. The device when once applied to the can need not be removed therefrom until the can is empty and ready to be discarded.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved device as applied to a milk can.

Fig. 2 is a top plan view of the spout disc detached.

Fig. 3 is a bottom plan view of the spike disc detached.

Fig. 4 is a fragmentary sectional elevation of said discs as assembled with one of the dispensing spouts shown in cooperative relation with a corresponding puncturing spike.

Referring now more particularly to the characters of reference on the drawings, the device comprises a circular base plate 1 on which the milk can 2 of standard size rests, the base having feet 3 to hold it a certain distance above the table. Projecting radially from the base in diametrally opposed relation and beyond the plane of the can are forked ears 4 to which are pivoted the lower ends of upstanding arms 5. Arranged to fit on top of the can and to extend over the entire area of the same is a circular cover plate 6 having opposed ears 7 to vertically aline with the ears 4, and provided with longitudinal slots 8 which extend inwardly from their outer ends to removably receive the upper ends of the arms 5. The upper ends of the ears 7 have transversely extending grooves 9. These grooves are adapted to receive the lower ends of dogs 10 which are pivoted on the upper ends of the arms 5 in connection with handle members 11. These handle members extend thence outwardly and then downwardly to engage the arms intermediate their ends, and are provided with notches 12 at their lower inner ends to engage the arms and prevent lateral movement of the handle members at such ends.

The lower ends of the dogs when engaged with the notches and when the lower ends of the handles are thus engaged with the arms lie in vertical planes inwardly of the pivotal pins 13 of the dogs and handles, so that they are past an inner dead center position and will hold against undesired disengagement with the notches.

Depending from the plate 6 in opposed alinement and on a line at right angles to the ears 7 are pointed spikes 14, of sufficient length to project into the can a certain distance and positioned so that they will puncture the can near the edges. Compressible washers 15 surrounded the spikes so that close contact with the can will be maintained when said plate is applied thereto and held in connection with the base plate in the manner as above stated.

The spikes are provided with longitudinal passages 16 extending from the top of the plate 6 to the sides of said spikes intermediate their ends. The side terminations of these passages face away from each other or so as to face the adjacent sides of the can. Superimposed on the plate 6 and turnably mounted in central relation therewith by a screw 17 is an upper plate 18, substantially the same diameter as the plate 6. This upper plate has radial and diametrally opposed extensions 19 which are provided with longitudinal grooves 20 in their upper faces to form pouring spouts. From the bottom of each groove a hole 21 extends through the plate to communicate with the corresponding one of the passages 16. The plates 6 and 18 have a close fit so that the one will not turn too easily on the other and so that no milk will leak from between the same at the junction of the holes 16 and 21 when said milk is passing therethrough.

It will therefore be seen that when the plate 18 is turned so that the holes 21 register with the passages 16, a tilting of the can so that either spout has a downward slant will cause the milk to flow from the can, the other pair of registering passages allowing the necessary air to enter the can at the same time. When the pouring operations are completed and it is desired to protect the remaining contents of the can against contact with air and to prevent spilling, it is only necessary to rotate the plate 18 so that the holes 21 may be moved out of register with the passages 16. To limit the rotation of the plate 18 so that it cannot turn more than the necessary distance I may if desired cut a concentric slot 22 through said plate 18 to receive a pin 23 fixed in the lower plate 6.

When it is desired to remove the device from the can, the handles 11 are swung outwardly so as to move the dogs 10 a sufficient distance past their dead center position in an outward direction so as to enable them to clear the notches 9. The arms 5 may then be swung clear of the ears 7 and the plate 6 removed, when the can may then of course be taken off the base plate.

When mounting the device onto a fresh can the plate 6 is applied first and given the necessary downward pressure so that the spikes will puncture the can. The can is then set on the base so that the latter is in the proper position relative to the plate 6, and the arms 5 are then coupled up to said plate as before stated. The compressible washers enable the necessary frictional engagement of the upper and lower members with the can to be had when the dogs 10 are moved into holding engagement with the notches.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A can puncturing and dispensing device comprising a base member to form a support for a can, a plate to rest on the can, opposed spikes on the plate to puncture the top of the can, means between the plate and base for holding the two in frictional engagement with the can, said spikes having passages leading therethrough to the top of the plate, another plate superimposed and turnably mounted on the spike plate and having openings therethrough to register with the spike openings, and a spout formed with said upper plate and projecting outwardly therefrom; said spout leading from an adjacent opening therein.

2. A can puncturing and dispensing device including a plate to rest on a can, spikes depending from said plate to puncture the top of the can, said spikes having passages leading therethrough to the top of the plate, means for removably holding said plate in frictional engagement with the can-top, another plate turnably mounted on said first plate, and opposed spouts projecting outwardly from said upper plate and having openings extending thence through the upper plate to communicate with the spike-openings at their upper ends.

3. A can puncturing and dispensing device comprising a base member to form a support for a can, a plate to rest on the can, opposed spikes on the plate to puncture the top of the can, and having passages therethrough leading to the top of the plate, arms pivoted onto the base and projecting upwardly therefrom, slotted ears projecting outwardly from the plate to receive the upper ends of the arms, and means mounted on the arms and adapted to detachably engage the ears for holding said arms in place in the ears and for maintaining the base and plate in frictional engagement with the can.

4. A can puncturing and dispensing device comprising a base member to form a support for a can, a plate to rest on the can, opposed spikes on the plate to puncture the top of the can, and having passages therethrough leading to the top of the plate, arms pivoted onto the base and projecting upwardly therefrom, slotted ears projecting outwardly from the plate to receive the upper ends of the arms, handle members pivoted on the arms at their upper ends and extending thence outwardly and downwardly for detachable engagement with the arms intermediate their ends, and dogs mounted in connection with the pivoted ends of the handles for detachable engagement with notches cut transversely in the upper faces of the ears.

In testimony whereof I affix my signature.

ERNEST ALLEN.